United States Patent [19]

Edling

[11] Patent Number: 4,940,018

[45] Date of Patent: Jul. 10, 1990

[54] TOY FOR CATS

[76] Inventor: Theodore L. Edling, P.O. Box 593, Bethel Island, Calif. 94511

[21] Appl. No.: 111,816

[22] Filed: Oct. 20, 1987

[51] Int. Cl.$^5$ ............................................. A01K 15/02
[52] U.S. Cl. ...................................................... 119/29
[58] Field of Search ............................ 119/1, 29, 29.5; 273/34 R, 58 C, 184 B, 200 R, 413

[56] References Cited

U.S. PATENT DOCUMENTS

| | | | |
|---|---|---|---|
| 1,699,308 | 1/1929 | Postings | 119/29 |
| 1,828,892 | 10/1929 | Felton | 273/34 R |
| 2,096,078 | 9/1935 | Windson | 119/29 |
| 2,481,559 | 9/1949 | Ashbaugh | 119/121 |
| 2,584,782 | 2/1952 | Beckman | 119/22 |
| 3,067,717 | 12/1962 | Imparato | 273/34 R |
| 3,216,723 | 11/1965 | Galezniak | 273/58 C |

FOREIGN PATENT DOCUMENTS 229114  2/1925  United Kingdom ............. 273/34 R

Primary Examiner—John Weiss
Attorney, Agent, or Firm—Thomas M. Freiburger

[57] ABSTRACT

A toy for cats induces enthusiastic play by cats, either with human participation or without. A flexible rod can be mounted in a base member by a coil spring, providing a pendulum-like swinging movement of the rod. A toy member hangs from the end of a line or string, which in turn is suspended from the upper end of the flexible rod. When the toy member is batted by a cat, it moves through a complex pattern of movement due to the pendulum motion of the rod and a separate pendulum-like motion of the line and toy member. The flexible rod may be removed from the base and spring, for manual play with the cat.

13 Claims, 1 Drawing Sheet

U.S. Patent   Jul. 10, 1990   4,940,018
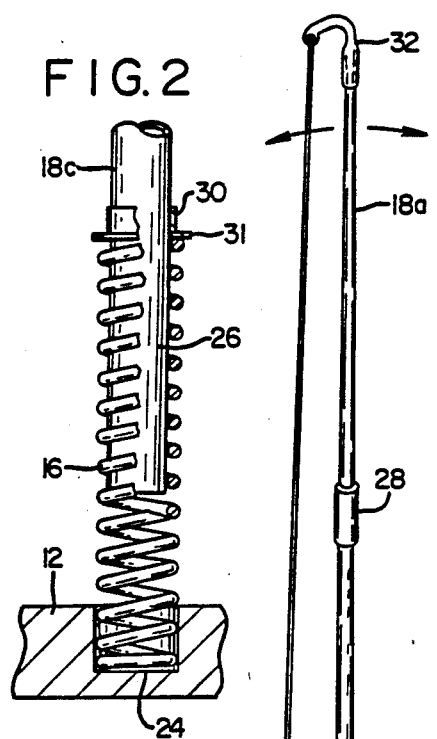
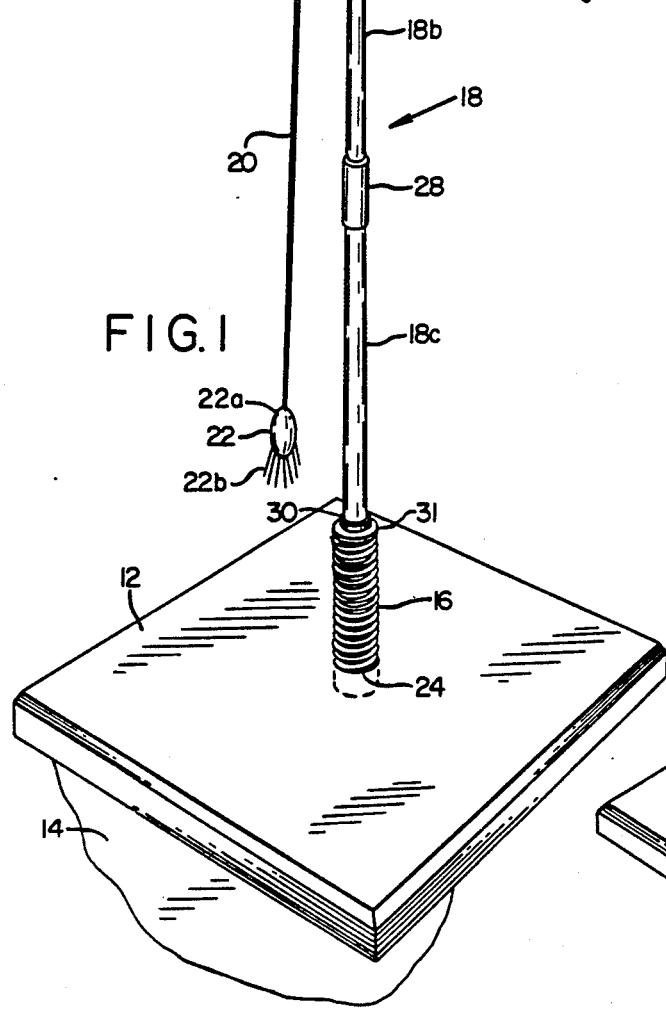
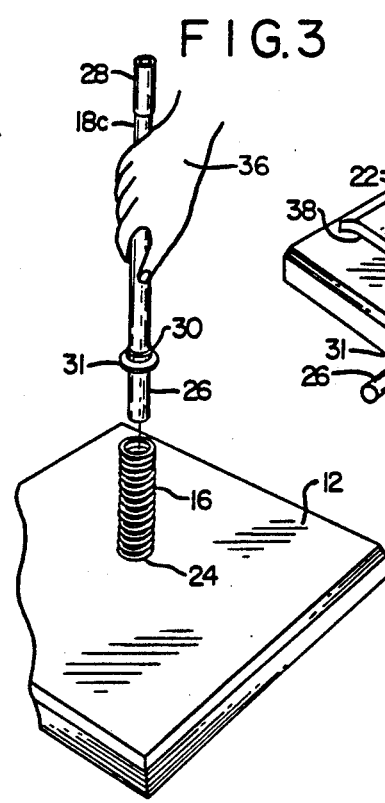
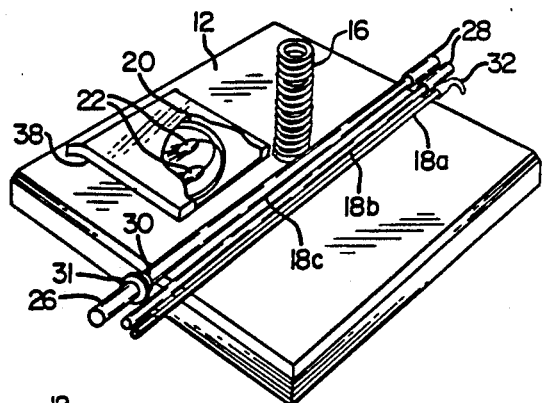
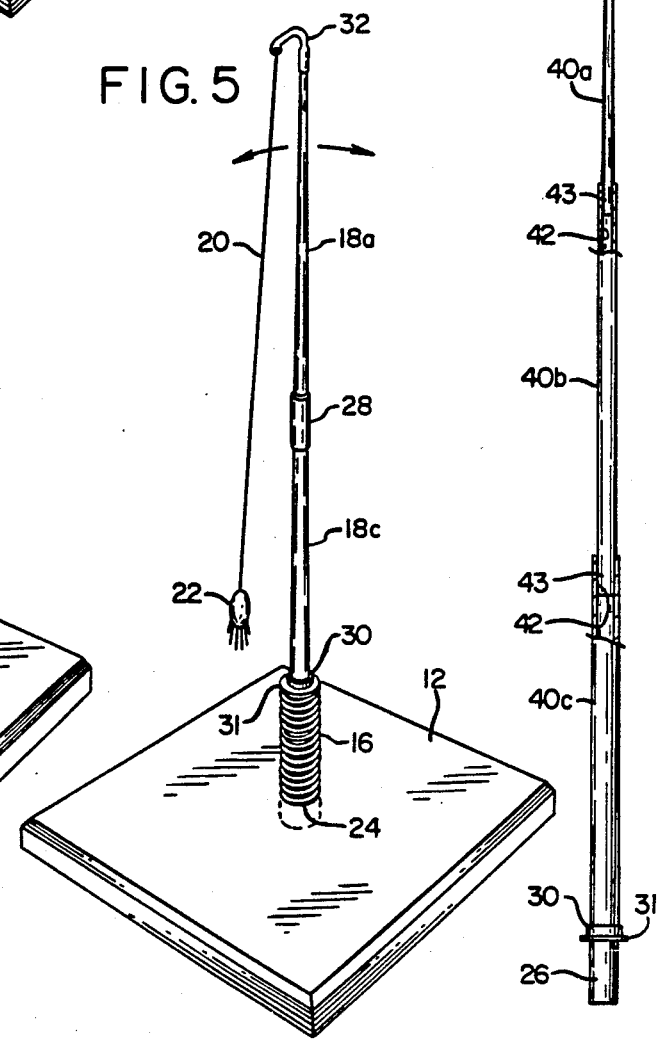

TOY FOR CATS

BACKGROUND OF THE INVENTION

The invention relates to pet amusement apparatus, and more particularly to a device for amusing and exercising cats.

Cat amusement devices and toys of various descriptions have been known. For example, see U.S. Pat. Nos. 4,499,855, 3,097,626, 4,577,590, 4,517,922, 3,295,499 and 2,833,244.

Of the above patents, Felten U.S. Pat. No. 3,097,626 disclosed a cat toy having a base to which is affixed a tall coil spring, with the coils closely coiled together as in a screen door type spring. The spring stood vertically and supported from its top a flexible line which held a toy mouse at its bottom. The toy of the Felten patent did not produce the same type of complex movement as that of the present invention described below, and would not tend to produce a long-lasting undulating motion lasting several moments beyond any play activity of a cat, as in the present invention.

Moreover, the Felten device did not have any provision for removal of a central mast for manual play with the cat, using only a mast, line and toy member.

Galkiewicz U.S. Pat. No. 4,499,855 listed above discloses a hand held rod with a cord at the end, supporting a cat toy. It is emphasized in the patent that the cat toy member has a covering which can be readily grasped or snagged by the claws of a cat, which differs from the present invention. Also, importantly, the Galkiewicz patent does not disclose any base member, the device being limited to use as a hand held toy for manual play with a cat.

The remaining patents listed above show various types of animal amusement devices which include a cord or string from which a play object is suspended. None produces the type of motion nor has the versatility for different types of use as in the present invention described below.

SUMMARY OF THE INVENTION

A toy for cats in accordance with the present invention has a base member adapted to lie flatly on a floor or other surface. A flexible rod is connectible vertically to the top of the base member by a resilient means, such as a coil spring secured into the base. A flexible line or cord hangs down from the top end of the flexible rod, and supports at its bottom a toy member attractive for play by a cat. At the top of the flexible rod may be a stand-off string connector, for slightly offsetting the point of connection of the string away from the rod.

The resilient means has provision for readily removing the flexible rod from the base, and in the case of a coil spring this simply comprises the slipping of the base end of the rod into the open upper end of the coil spring, so that gravity holds the flexible rod in the coil spring and in connection with the base.

The flexible rod may be in multiple sections, such as three sections, easily separable and assembled by manual press-fitting. This enables the rod to be assembled with difficult members of sections to produce different heights, and also provides for more compact storage and shipping of the cat toy apparatus.

The toy member at the end of the flexible line or string may comprise a fishing lure type item, such as the type having a series of tassels hanging from it, for further inducement of the cat to play.

It is therefore among the objects of the invention to provide a versatile toy for cats, which instantly and reliably induces the cat to play and exercise itself when the device is assembled in a base and resting on a floor, and also with provision for human assisted play when the flexible rod is held manually by a person playing with the cat. These and others objects, advantages and features of the invention will be apparent from the following description of a preferred embodiment, considered along with the accompanied drawings.

DESCRIPTION OF THE DRAWINGS

FIG. 1 is a perspective view showing a toy for cats in accordance with the invention, with a base and a flexible rod assembled together in a configuration for a cat to play by itself, teased by a toy member at the end of a line secured to the rod.

FIG. 2 is a detailed view in section of the base and a portion of the rod, showing the preferred manner of support of the rod in the base.

FIG. 3 is a perspective view showing a person pulling the rod out of the base for manual play with a cat by hand-holding the flexible rod and teasing the cat with the toy member.

FIG. 4 is a view showing the cat toy apparatus dismantled, with the flexible rod in three separated sections, as for storage and shipping.

FIG. 5 is a view similar to FIG. 1, but showing a shorter version of the assembly using fewer than all of the flexible rod sections to form the rod, and with a shorter length of flexible line.

FIG. 6 is a fragmented view showing the rod made up of telescoping sections which firmly engage when pulled outwardly in a lengthening direction.

DESCRIPTION OF PREFERRED EMBODIMENTS

In the drawings, FIG. 1 shows a cat toy assembly 10, the principal elements of which are a base 12 for resting on a floor 14 or other surface, a resilient member 16 providing lateral flexure, a flexible rod 18 which may be comprised of a series of connected sections 18a, 18b, 18c, a flexible line or cord 20 connected at the top of the flexible rod 18, and a cat toy member 22 connected to the lower end of the flexible line.

As indicated in the drawings, the base 12 is of sufficient lateral dimensions relative to the height of the flexible rod 18 to give considerable stability to the cat toy assembly even when the rod 18 is tilted far off vertical, even to a position substantially horizontal. The base may be square as shown, circular or in other polygonal shapes, but should have a minimum lateral dimension of about 7 to 8 inches, for a rod height of about 42 inches, or in the range of about 40 to 45 inches. Also, for these dimensions, the weight of the base should be at least about 10 ounces, preferably about 14 ounces, for best stability.

The resilient member 16 preferably comprises a simple coil spring, such as an open-coil compression spring as shown, tightly fitted into a bore 24 in the base. The bore 24 should be at least about one-half inch deep for tightly retaining the spring or resilient No. 16 in place, while allowing the spring to pivot about a point just above the base. The rod is actually suspended entirely above the upper surface of the base, as shown in FIG. 2.

The resilient rod 18 has a base end 26 sized to fit loosely but closely into the cylinder defined by the interior of the spring 16, which may have an internal diameter of about ⅜ inch. This enables the easy and quick removal and replacement of the flexible rod in the spring. If desired, the spring 16 may be coated with a high-friction material such as vinyl, so the replacement and removal of the rod from the spring is still easily accomplished, but the rod is more firmly held in the spring when being played with by a cat, even when pulled to a horizontal position.

As shown in the drawings, the several sections 18a, 18b, 18c of the flexible rod 18 may be joined by press-fit coupling joints 28, of the type used on some fishing rods wherein a tapered socket receives a generally cylindrical rod end. The rod itself may be formed of materials similar to the fishing rod, to provide flexibility and "whip." Such materials may include fiberglass reinforced plastic and graphite fiber reinforced plastic.

As shown particularly in FIG. 2, the base end of the rod 18, i.e. the bottom end of the lower section 18c as shown in the drawings, may be fitted with a ferrule or sleeve 30 to provide correct fit into the resilient member or spring 16. A lip 31 of larger diameter than the spring at the top of the ferrule supports the rod in the spring, at a level such that its bottom end remains above the base 12, preferably about ½ inch.

The upper end of the flexible rod member 18 may have an offset connecting bracket 32 as shown, for supporting the upper end of the flexible line member 20 in a position slightly offset laterally from the rod, so that the string and the toy member 22 hang outwardly somewhat from the flexible rod. Also, the rod rests in the spring and the spring is secured to the base 12 preferably in such a way that the rod at rest is slightly off vertical. These features assure that the toy member 22 in the rest position will hang about two to four inches outward from the rod 18, for helping induce the cat to play.

The toy member 22 itself may take a variety of forms, preferably one which is attractive to a cat and tending to induce play, such as the fishing lure type item 22 shown in the drawings. Such a toy member may comprise a body member 22a having a minimum mass enabling proper swinging motion when played with by the cat. The mass may be at least about 1/15 ounce for a preferred embodiment as described herein. The surface of the body 22a may be rubbery, not ordinarily snagged in the claws of the cat. Tassels 22b may hang down from the body member 22a, as on certain fishing lures. The toy 22 thus invites a cat to bat it or to catch the toy in its mouth.

The offset connecting bracket 32 at the top of the rod 18 may be capable of freely swiveling about the rod 18 to prevent wrapping of the line 20 about the rod during play. Ball bearings or roller bearings (not shown) may be fitted between the rod and the connector bracket 32 to permit near-frictionless rotation if desired. However, a simpler construction is preferred wherein the bracket 32 is simply fixed to the rod.

FIG. 3 shows the flexible rod 18, line 20 and toy object 22 being removed from the base 12 and spring 16 to be used for manual play with a cat or kitten. The base of the rod 18 has been removed from the resilient member or coil spring 16 and is held in the hand 36 of a user. The flexibility of the rod 18 helps facilitate the use of the device in such a way as to tease the cat, by whipping the line and toy member 22 back and forth.

FIG. 4 shows the cat toy 10 disassembled, with the flexible rod 18 in separate sections, e.g. three sections, removed from the base 12 and spring 16. The flexible line 20 and one or several toy objects 22 may be contained in a packet 38, for tying on the end of the flexible rod by the user. The components of the assembly 10 are therefore made compact for packaging, storing and shipping.

FIG. 5 shows the components of the cat toy 10 assembled with fewer than all of the sections of the flexible rod 18. As shown in FIG. 5, the assembly may be made with only two of the rod sections 18a and 18c. These are pressed together using the press-fit coupling joint 28, as described above, and the lower section 18c is then dropped into the cylindrical space defined by the coil spring 16, as above. The line 20 is made shorter to accommodate the shorter rod 18.

The above described preferred embodiments are intended to illustrate the principles of the invention, but not to limit the scope of the invention. Various other embodiments and modifications to these preferred embodiments may be made by those skilled in the art, without departing from scope of the following claims.

FIG. 6 shows another form of resilient rod 40 which may be used in the cat toy of the invention. As in some fishing rods, the rod 40 telescopes to a compact configuration wherein its three sections 40a, 40b and 40c are all coextensive, contained within the largest-diameter section 40c. When the sections are pulled in the extending, separating direction, the sections lock together via the progressive taper in all the sections. The top section 40a will fit entirely within the tapered internal bore 42 of the middle section 40b, but the lower end 43 of the section 40a is too large to exit the narrow top of the middle section bore 42. The same is true with respect to the fitting of the middle rod section 40b inside the lower section 40c. Thus, all sections telescope together for storage. The telescoping arrangement is preferred for its ease of assembly and convenience in shipping, storage and packaging.

I claim:

1. A toy for exercising cats, comprising,
   a base for resting on a floor or other surface and for stabilizing the toy,
   a flexible rod,
   resilient means positioned between the base and a base end of the flexible rod, for connecting the base end of the flexible rod to the base and for facilitating resilient swinging pendulum-like movement of the rod from a generally vertical position through angular tilting movements with respect to the base, said resilient means tending to bring the flexible rod back up to the generally vertical position, and including means associated with the resilient means for permitting quick removal of the flexible rod from the base so that the rod can be held manually by its base end, said resilient means comprising a coil spring fixed to the base and extending upwardly a short distance from the base, and sized to slidingly receive in its upper end the base end of the flexible rod,
   a flexible line member extending from an upper end of the flexible rod, opposite the base end of the rod, hanging down from the upper end of the rod and extending near to the base in a rest position of the toy, and
   a toy member connected to a lower end of the flexible line member, means for offsetting the toy member slightly laterally away from the flexible rod as the rod sits in the spring in the base, in a normal rest position of the toy member, whereby the toy member hanging from the flexible rod attracts play by a cat, and when the toy member is batted by the cat it moves in a complex pattern due to pendulum type motions of the line member and of the flexible rod line the coil spring, teasing the cat and inducing further play, and whereby the flexible rod maybe removed from the spring in the base so that a person can tease and play with the cat manually using the rod, the line and the toy member.

2. A toy for cats as in claim 1, wherein the coil spring extends up from the base about two inches, and wherein the rod includes an enlarged lip spaced above the bottom end of the rod and positioned to engage the top end of the spring to suspend the rod in the spring with the bottom end of the rod above the base to facilitate the pendulum type motion of the rod.

3. A toy for cats as in claim 1, wherein the flexible rod member is about 42 inches long.

4. A toy for cats as in claim 3, wherein the flexible rod member comprises a plurality of sections which are manually separable, and assemblable.

5. A toy for cats as in claim 1, wherein the flexible rod member is formed of a fiberglass-reinforced plastic.

6. A toy for cats as in claim 1, wherein said means for offsetting is attached at the upper end of the flexible rod and includes a line connector bracket member which is angled to suspend the flexible line at a position spaced slightly offset from the flexible rod.

7. A toy for cats as in claim 1, wherein the base member is at least about 8 inches in minimum lateral dimension, and wherein the flexible rod is about 42 inches long, so that the base member is wide enough to generally prevent tipping as the toy is played with by a cat.

8. A toy for cats as in claim 7, wherein the base member weighs at least about 10 ounces.

9. A toy for cats as in claim 1, wherein the flexible line member comprises nylon fishing line.

10. A toy for cats as in claim 1, wherein the toy member is of a material which generally does not readily snag in the claws of a cat.

11. A toy for cats as in claim 10, wherein the toy member comprises a fishing lure-type member including depending tassels.

12. A toy for cats as in claim 1, wherein the flexible rod comprises a plurality of telescoping sections which may be pushed together to contain all sections coextensively and pulled in an extending direction to extend the rod to full length, and including locking fitting means at the adjacent ends of sections when extended for rigidly engaging the sections together and preventing separation of the sections.

13. A toy for cats as in claim 12, wherein the flexible rod comprises three sections.

* * * * *